United States Patent [19]
Ebenhoch et al.

[11] Patent Number: 5,704,740
[45] Date of Patent: Jan. 6, 1998

[54] DRILLING TOOL, PARTICULARLY FOR METALLIC MATERIALS

[75] Inventors: Sebastian Ebenhoch, Sussex, Wis.; Lothar Fauser, Nehren; Siegfried Bohnet, Moessingen, both of Germany

[73] Assignee: Walter AG, Tuebingen, Germany

[21] Appl. No.: 494,444

[22] Filed: Jun. 26, 1995

[51] Int. Cl.$^6$ ................................................ B23B 51/02
[52] U.S. Cl. ........................ 408/59; 408/224; 408/229; 408/230
[58] Field of Search ................... 408/59, 200, 223, 408/224, 227, 229, 230

[56] References Cited

U.S. PATENT DOCUMENTS

| 283,509 | 8/1883 | Pendleton | 408/230 |
|---|---|---|---|
| 3,966,349 | 6/1976 | Osman et al. | |
| 4,149,821 | 4/1979 | Faber. | |
| 4,563,113 | 1/1986 | Ebenhoch. | |
| 5,049,011 | 9/1991 | Bohnet et al. | |
| 5,173,014 | 12/1992 | Agapiou et al. | 408/230 |
| 5,478,176 | 12/1995 | Stedt et al. | 408/230 |

FOREIGN PATENT DOCUMENTS

| 0 118 035 B1 | 9/1984 | European Pat. Off. | |
|---|---|---|---|
| 0 589 333 A1 | 3/1994 | European Pat. Off. | |
| 0 613 746 A2 | 9/1994 | European Pat. Off. | |
| 35 45 586 | 7/1987 | Germany. | |
| 213911 | 9/1987 | Japan | 408/227 |
| 567560 | 8/1977 | U.S.S.R. | 408/230 |
| 671940 | 7/1979 | U.S.S.R. | 408/230 |
| 921707 | 4/1982 | U.S.S.R. | 408/230 |
| 2184373 | 6/1987 | United Kingdom | 408/230 |

*Primary Examiner*—Daniel W. Howell
*Attorney, Agent, or Firm*—Frishauf, Holtz, Goodman, Langer & Chick, P.C.

[57] ABSTRACT

Cutting elements or cutter chips (7, 8) are located on a tool body (1). Cutting chip removal spaces (14, 15) are formed in the tool body in three segments. A first segment (I) adjoins the end face (4) of the drill body and includes at least one cutting element seat (10, 11); a chip removal space extends axially, i.e. straight, or slightly obliquely fluted. A second segment (II), adjacent thereto, is formed partially helically with a twist (21) of less than 90° relative to the tool body axis; the second segment (II) terminates axially at a point where, in operation, the direction of radially acting cutting forces coincides essentially with the primary axis of inertia (0-0) of the geometrical moment of inertia. A third segment (III) adjoins the second segment (II); it is essentially straight-fluted.

25 Claims, 4 Drawing Sheets

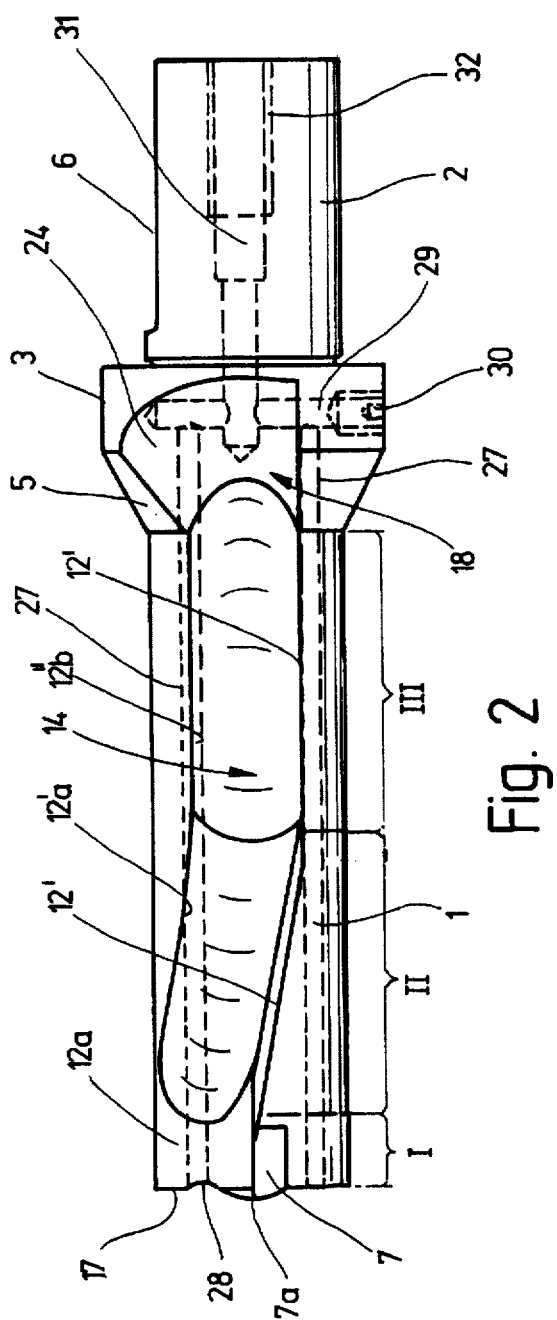
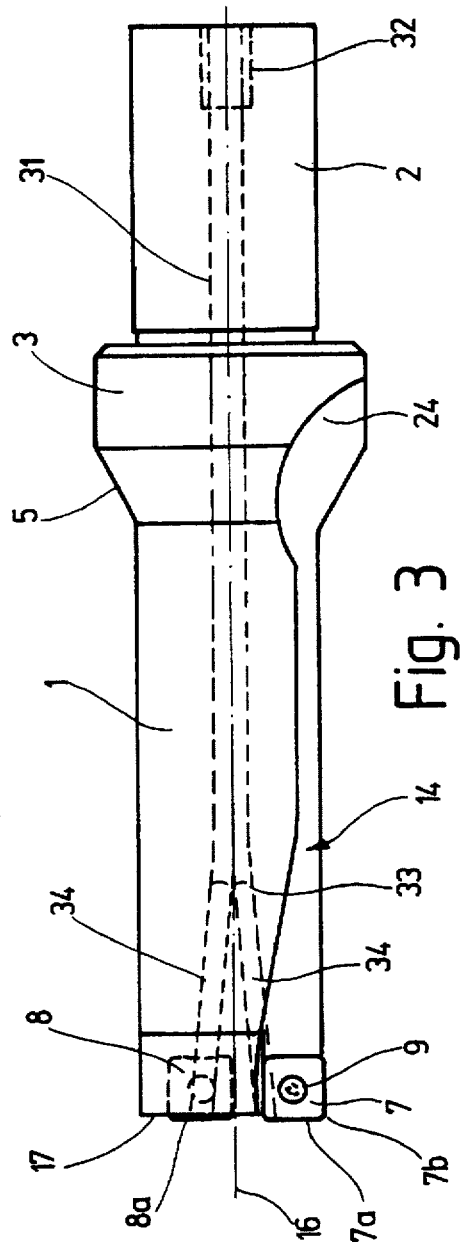

DRILLING TOOL, PARTICULARLY FOR METALLIC MATERIALS

Reference to related patents, the disclosures of which are hereby incorporated by reference:
U.S. Pat. No. 5,049,011 (Bohnet et al.)
U.S. Pat. No. 3,966,349 (Osman et al.)
U.S. Pat. No. 4,149,821 (Faber)
U.S. Pat. No. 4,563,113 (Ebenhoch)
EP 0 613 746 A2

FIELD OF THE INVENTION

The invention relates to a drilling tool, particularly for metallic materials, having an essentially cylindrical drill body, which on a fastening end has a coaxial fastening shank and on its other end, toward the cutting edge, is equipped with cutting elements. At least one flutelike chip removal space or recess is formed on the outer circumference of the drill body; this recess is open on the cutting-edge end of the drill body in the end face thereof and extends over the length of the drill body into the region of its fastening end. When there are two or more chip removal spaces, they are located on opposed sides of the drill body axis.

BACKGROUND OF THE INVENTION

A drilling tool of this kind with two chip removal spaces has been described in U.S. Pat. No. 5,049,011 (Bohnet et al.), for instance. In this drilling tool, the cutting elements are received in seats formed in the region of the two chip removal spaces on the end of the drill body toward the cutting edge. They are formed as rotatable cutting bits, with a continuous fastening hole, and are secured releasably to the drill body by a locking screw. One of the cutting elements is located radially outward such that with an outer cutting edge corner adjacent to a main cutting edge, it protrudes radially past the circumference of the drill body, while a second cutting element is located inside the flight circuit of the outer cutting edge corner of the first cutting element. The cutting forces engaging the cutting edges of the cutting elements that are operative on the face end of the drill body in material removing machining generate a resultant radial force, pointing radially outward from the rotary axis of the drilling tool, that is radially oriented in a certain angular position relative to the cutting elements, this position being dictated by the cutting edge geometry and by the location of the cutting elements. The creation and orientation of this radial force are discussed in the aforementioned US patent. This radial force is oriented essentially crosswise to the main cutting edges of the cutting elements that are operative at the end face of the drill body, and its effect is that in material removing machining, a bending moment is exerted on the drill body, the value of this moment increasing as the distance from the end of the drill body toward the cutting edge increases. In long drilling tools, this bending moment is therefore correspondingly high on the fastening end of the drill body.

The chip removal spaces located axially on opposite sides of the drill body are fluted rectilinearly in the known drilling tool, or in other words have straight flutes, parallel to the axis of the drill body. These chip removal spaces necessarily weaken the drill body somewhat. Since the resultant radial force occurring in material removing machining is oriented obliquely to the main axis of the areal moment of inertial in the straight-fluted drill shank, it causes a certain elastic bending deformation of the drill body, on the order of what happens with a profiled rod as it bends, and consequently the drilled hole is made with a somewhat larger diameter than the theoretical diameter of the flight circle of the outer cutting edge corner of the radially outer cutting element when the drill body is not deformed. In the known drilling tool, this effect is utilized to protect against the creation of scoring in the wall of the drilled hole when the tool is withdrawn from the hole. However, cases exist, particularly when the drill is quite long, in which the elastic bending deformations of the drill bodies that occur at high drilling power assume undesirably high values. It is also possible, depending on the orientation and magnitude of the radial force, for the drilled hole even to have a diameter smaller than what would match the theoretical diameter.

It is known from U.S. Pat. No. 3,966,349, Osman for instance, to provide a hard metal striplike support element on the circumference of the drill body, at a point where the support element can divert the resultant radial force produced in material removing machining into the drilled hole wall. However, such support elements are expensive and impractical for relatively small drill diameters.

Another proposal made in U.S. Pat. No. 4,149,821 (Faber) is to avoid the creation of any resultant radial force whatever in material removing machining, by suitably designing the cutting edge geometry of the drilling tool. Since for economic reasons, among others, it is desirable not to use a large number of different cutting elements (rotatable cutting bits), however, it is difficult in practice to avoid resultant radial forces in all the drill diameters of one series of drilling tools. This is also true of a fundamentally similar drilling tool in accordance with European Patent Disclosure EP 0 613 746 A2, Tukala et al., whose cutting edge geometry is also designed to compensate for radial force. Since when the drill body emerges from the drilled hole of a drilled work piece, only the rotatable cutting disk on the circumference is still in operation, as resultant radial force occurs at its cutting edges that leads to a radial deflection of the effective cutting edge corner, and hence to a decrease in the drilled hole diameter at the end of the drilled hole.

To reduce this deflection, the two chip removal spaces, located on opposite sides of the drill body axis, are formed as entirely spiral over the entire length of the drill body up to the fastening end thereof; the two angle (twist) over the axial length of the drill body is at least 110°. Not only does the fully spiral form of the chip removal spaces weaken the bore body outside the drill body, but a different angle of inclination of the fully spiral chip removal spaces must also be used for each different length of drilling tool, so that the resultant radial force in each case will be located at the desired angular position with respect to the orientations of the axis of the maximum and the axis of the minimum areal moment of inertia of the drill body on the fastening end.

While the drilling tool referred to at the outset herein and described in U.S. Pat. No. 5,049,011 (Bohnet et al.), like a similar drilling tool known from U.S. Pat. No. 4,563,113 (Ebenhoch), has straight-fluted chip removal spaces that are oriented parallel to the drill body axis, drilling tools also exist in which the chip removal spaces are twisted helically; among other reasons, this is done to help move chips on out of the way.

Aside from the fact that such fully spiral drilling tools, compared to straight-fluted drilling tools, have a long chip removal path and involve major weakening of the bore body, they have the fundamental problem that for a given drilling tool type of predetermined diameter, the elastic bending of the drill body that occurs under the influence of the resultant radial force fluctuates greatly with the length of the drilling tool. This is because the angular position of the main axis of inertia forces involving the areal moment of inertia rotates progressively in the axial direction of the drill body in accordance with the helical coiling of the chip removal spaces; as a consequence, the spatial position of the orientation of the resultant force relative to the orientation of the main action of inertia forces of the areal moment of inertia of the drill body at the root of the chip removal spaces, or in other words in the region where the drilling tool is fastened, is dependent on the point on the circumference at which the ends of the chip removal spaces each come to rest. Since the angular position of the resultant radial force to the main axis of areal inertia forces at the fastening point of the drill body determines the orientation and magnitude of the elastic radial deflection occurring in material removing machining at the cutting edge end of the drill body, spirally fluted drilling tools of fundamentally the same design but with slightly different length can already produce markedly different results in drilling. Examples of such spirally fluted drilling tools are described in EP 0 589 333 A1 and EP 0 118 035 B1 (Guering), some of which drilling tools have helically extending internal cooling ducts for the cutting elements. Cooling ducts formed in this way are complicated and expensive to make, however.

In the industry, drilling tools are also known whose drill body in the region of the cutting element seats has straight- or slightly obliquely-fluted chip removal spaces which are then adjoined by strongly twisted chip removal space segments that extend as far as the fastening region of the drill body. The twisted segment can also in turn be subdivided into segments with a differing helical inclination. For these drilling tools, the same comments made above apply in principle.

THE INVENTION

It is an object of provide a rotary cutting tool, typically a drilling tool that provides favorable chip removal conditions and is distinguished by great stiffness of the tool body to counter elastic bending deformation under the influence of radial forces resulting in material removing machining.

Briefly, the novel tool has, in addition to the characteristic referred to at the outset, means for improving the stiffness of the tool body to counter elastic bending under the influence of the resultant radial force that occurs during material removing machining, and has a special form or shape of the chip removal spaces in the tool body.

Each chip removal space is subdivided into three axially adjacent segments. A first segment I is located adjacent one or more cutting elements, all located on suitable cutting seats on the tool, and has a chip removal space which extends essentially axially, i.e. straight or slightly obliquely fluted, for a length at least slightly beyond the axial length of the cutting element. It is joined by a second segment which is part helically fluted with a twist which extends over a twist angle of less than 90°. The second segment has an axial length such that, at the end thereof where it adjoins a third segment, the primary axis of inertia of the geometrical moment of inertia, at least approximately coincides with the direction of resultant radial forces which arise in operation of the tool. The third segment is straight-fluted and, since the forces have been balanced at the junction between the second and third segments, can be of any desired length.

Because of the alignment of the main axis of areal inertia forces of the tool body in the third, straight-fluted segment toward the direction of the resultant radial force that occurs in machining at the operative cutting edges of the cutting elements, optimal stiffness of the tool body is attained. Since the third segment adjacent to the fastening end of the tool is fluted rectilinearly, for different lengths of tools of the same types, similar, predictable conditions pertain with respect to the elastic bending of the tool body about the root of the chip removal spaces. The partly twisted second segment, because of its short length, causes only a slight lengthening of the chip removal path compared with straight-fluted chip removal spaces in this segment, and causes the least possible weakening of the tool body and accordingly does not impair the torsional stiffness thereof. At the same time, the partly twisted chip removal spaces reinforce the motion of chips produced in the first segment at the cutting edges of the cutting elements; these chips can be conducted without difficulty into the straight-fluted chip removal spaces of the third segment. Precisely this segment, immediately adjoining the cutting element seats, is essential for the forming and orientation of the chips in the chip duct that is enclosed in the drilled hole. Removing chips to the chip removal spaces located axially farther back in the third segment can be done without difficulty because of the straight fluted form of these spaces, since here the chips needs merely be pushed out of the drilled hole. In the second segment, the chips are deflected away from the bore wall, which prevents them from being pressed outward against the bore wall. To reinforce this effect, the chip removal spaces can also be formed with a radial angle that, preferably is positive.

Finally, the relatively slight twisting in the second partly twisted segment makes it very simple to produce coolant ducts for the cutting elements. Specifically, at least over a portion of the length of the chip removal spaces—or over their entire length—straight coolant conduits that are simple to make can be provided in the tool body.

DRAWINGS

FIG. 2 is a side view of the drilling tool of FIG. 1;

FIG. 3 is a different side view of the drilling tool of FIG. 1 with a modified embodiment of the coolant ducts;

DETAILED DESCRIPTION

Figure 1:
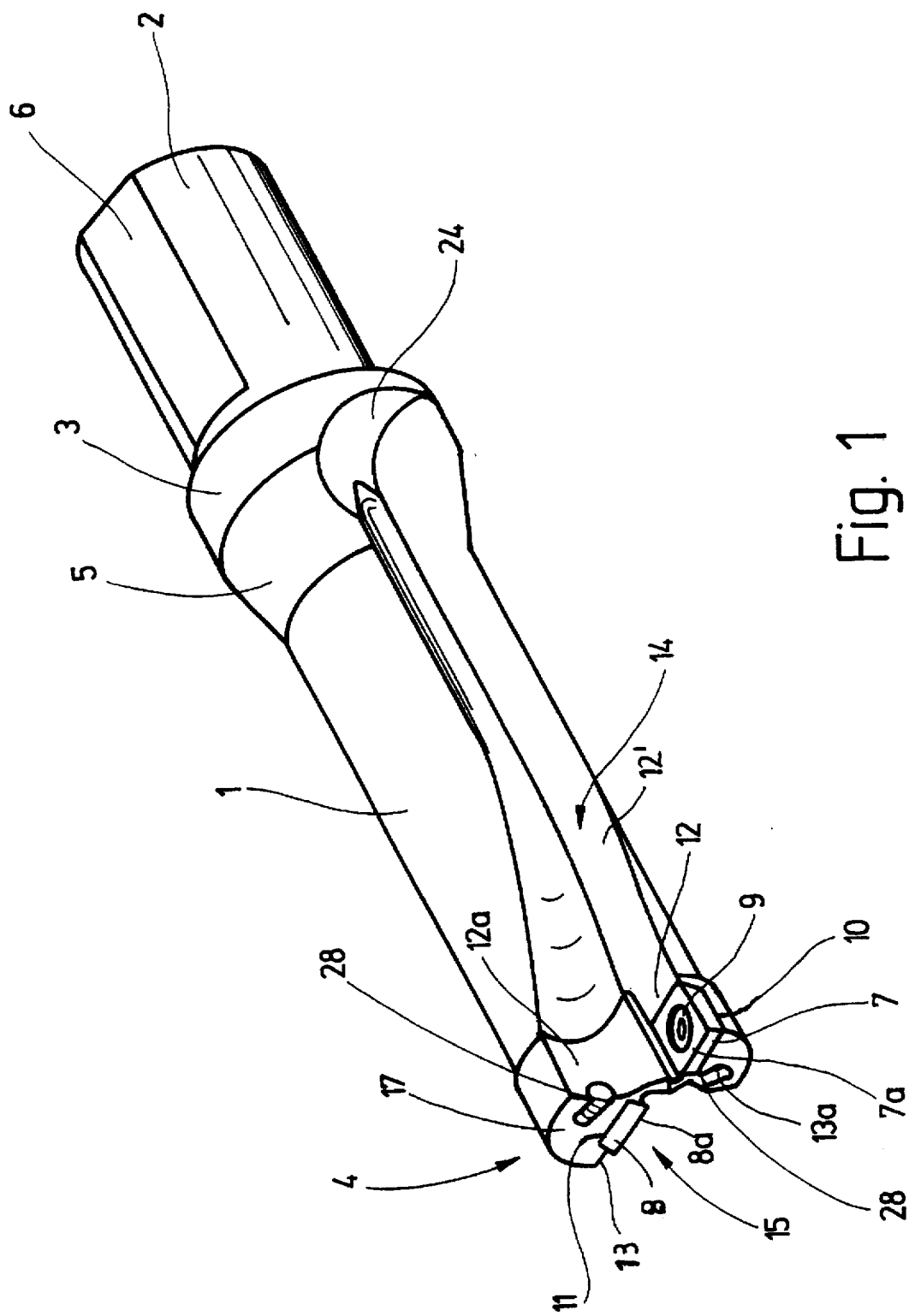
FIG. 1 is a prespective view of a drilling tool according to the invention.

The tool shown in the drawing is a boring, or drilling tool used to make bores in workpieces of steel or other metal materials as well as plastic and the like. It has a substantially cylindrical steel drill body 1, which on the fastening end has a cylindrical, coaxial fastening shank 2 that on one side adjoins a coaxial annular flange 3 of larger diameter, which is bounded toward the cutting edge end 4 of the drill body 1 by a frustoconical annular face 5. The fastening shank 2 is provided with a conventional flat face 6.

Figure 5:
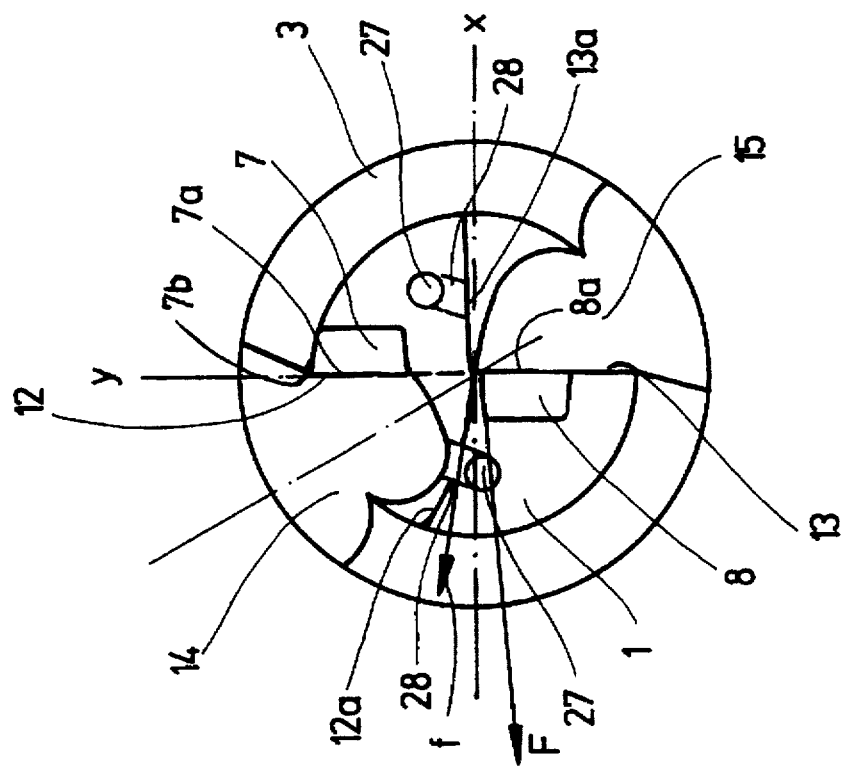
FIG. 5 shows the drilling tool of FIG. 1 in a view from the face end toward the cutting edges.

In the cylindrical drill body 1, there are two cutting elements in the form of rotatable cutting bits 7, 8 of hard metal in the region of the cutting edge end 4; in the present case, they are substantially square, and each is firmly but releasably screwed to the drill body 1 by a respective fastening screw 9 that passes through a fastening hole of the rotatable cutting bit. The rotatable cutting bits 7, 8 are each formed in truncated pyramid shape as so-called positive bits and are received in seats 10, 11, which in the form of pocketlike recesses are located in the region of the side walls 12, 13 (FIG. 5) of two substantially flutelike chip removal spaces 14, 15, which extend on both sides of the longitudinal axis, suggested at 16 in FIG. 3, of the drill body. Each of the chip removal spaces 14, 15 opens in the cutting-edge end face 17 of the drill body 1 and extends up to a root 18 in the region of the annular flange 3.

The two rotatable cutting bits each have on their longer wide side at the edge, four paired parallel cutting edges that can be worn down in succession, of which the drawings show the cutting edge—that is, the operative main cutting edge—7a and 8a, respectively, that protrudes radially past the end face 17 of the drill body 1. As can be seen especially from FIGS. 3, 5, the rotatable cutting bits 7, 8 are spaced radially differently apart from the drill body axis 16, such that the radially outer rotatable cutting bit 7, with a radially outer cutting edge corner 7b adjoining the operative main cutting edge 7a, protrudes radially past the circumference of the cylindrical drill body 1, and the other, radially inner rotatable cutting bit 8, with its main cutting edge 8a, intersects the drill body axis 16 or extends in the immediate vicinity thereof, and otherwise is located within the flight circle of the outer cutting edge corner 7b of the other rotatable cutting bit 7. Both rotatable cutting bits 7, 8 are each inserted with a practical axial and radial angle of the kind described in detail in U.S. Pat. No. 5,049,011 of the present assignee, for instance.

Figure 7:
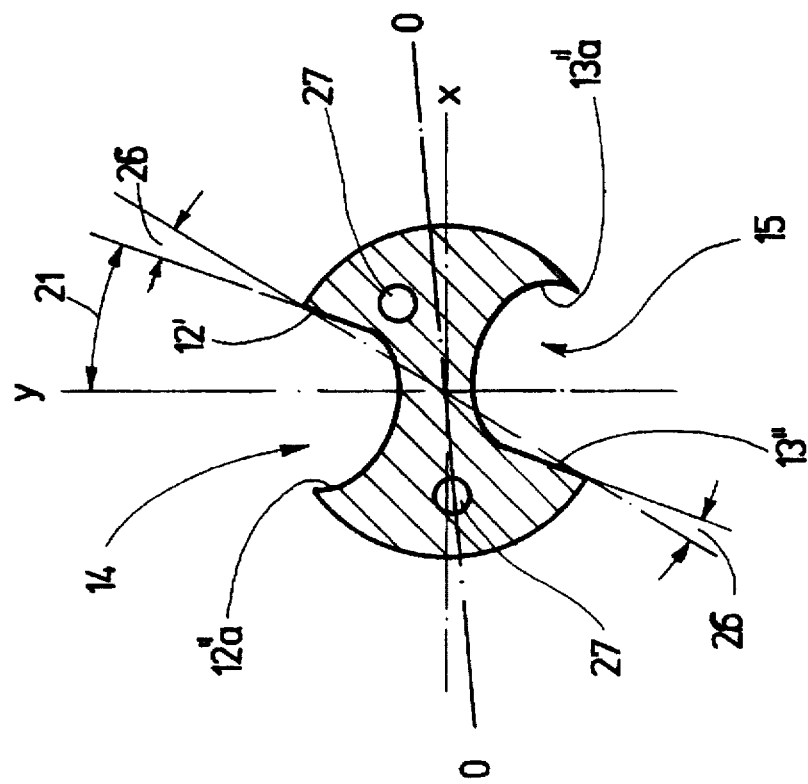
FIG. 7 shows the drilling tool of FIG. 1 in a view of the cross section of the drill body taken along the line VII—VII of FIG. 4.
Figure 6:
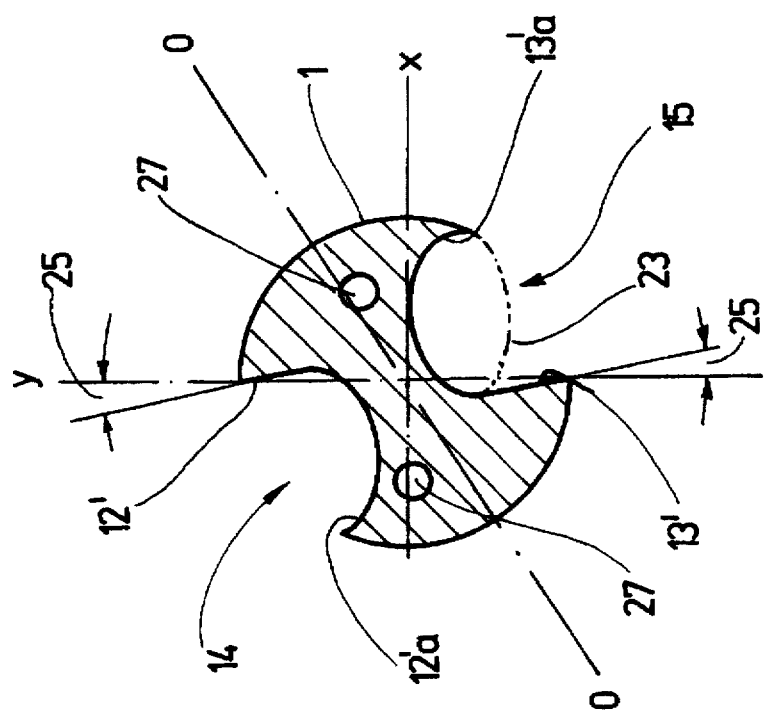
FIG. 6 shows the drilling tool of FIG. 1 in a view of the cross section of the drill body taken along the line VI—VI of FIG. 4.

When the drilling tool is in operation, or in other words in material removing machining of the workpiece, the operative main cutting edges 7a, 8a are engaged by reaction forces corresponding to the cutting forces; because of the cutting edge geometry chosen, these forces add up to make a resultant radial force F oriented radially outward from the drill body axis 16. This resultant radial force F is oriented essentially crosswise to the main cutting edges 7a, 8a, which are located approximately on a common diameter, of the two rotatable cutting bits 7, 8; its precise angular position, in the X and Y coordinate system shown in FIGS. 5–7, depends on the cutting edge geometry and on the installed position of the rotatable cutting bits 7, 8. The cartesian coordinate system X, Y is referred to the drill body axis 16 as the Z axis, and for orientation is aligned such that the Y axis is located in the diameter plate that approximately includes the operative main cutting edges 7a, 8a.

Figure 4:
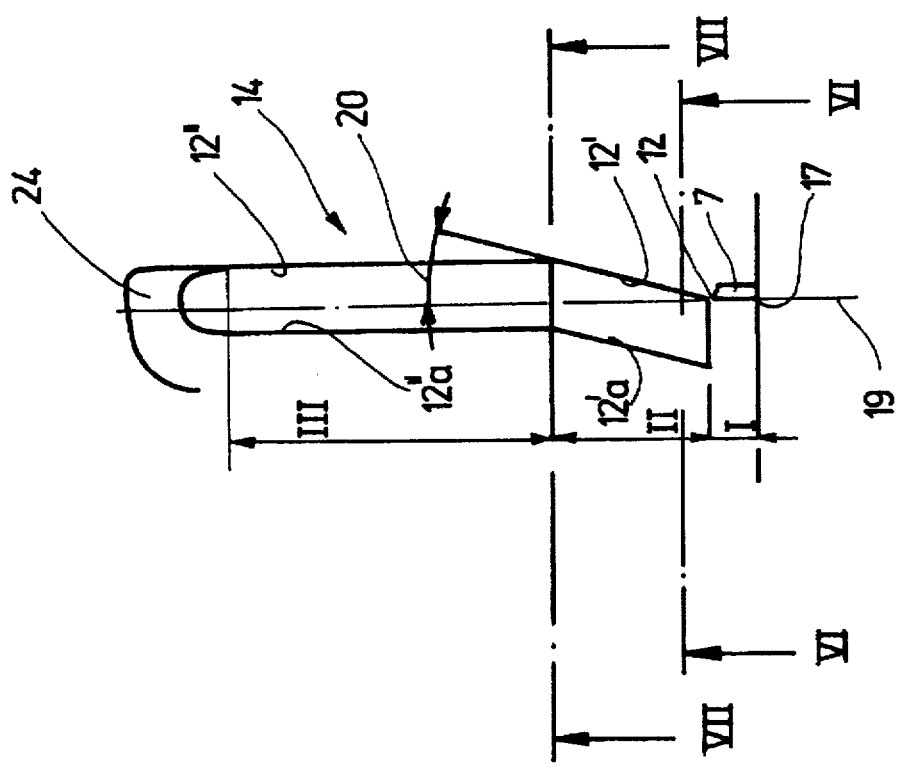
FIG. 4 is a fragmentary developed view of a chip removal space of the drilling tool of FIG. 1.

The resultant radial force F produced in the material removing machining, which engages the cutting-edge end 4 of the drill body 1, exerts a bending moment on the drill body 1 that increases from the end face 17 toward the fastening end of the drill body 1 and reaches its maximum in the region of the root 18 of the chip removal spaces 14, 15. It causes a certain elastic lateral bending of the drill body 1, which in turn causes a radial migration of the outer cutting edge corner 7b of the outer rotatable cutting bit 7 in the direction of the arrow f in FIG. 5. For drills of short length, this effect can be utilized to avoid scoring in the drilled hole wall when the drill is withdrawn from the hole. Particularly with drills of great length, however, it can impair the accuracy of the drilled hole. To reduce the elastic bending of the drill body in machining of the workpiece to a minimum that is insignificant for practical use, the following means are provided on the drilling tool:

The two flutelike chip removal spaces 14, 16 are each divided into three segments, which are marked I, II and III, respectively, in FIGS. 2 and 4 and in which the chip removal spaces are formed differently or located differently.

The first chip removal space segment I begins at the end face 17 of the tool body 1 and extends axially only slightly beyond the axial length of the rotatable cutting bits 7, 8. In this segment I, the segments of the chip removal spaces 14, 15, formed essentially as rectangular flutes pointing toward the drill body axis 16 with their apex, are fluted in axial direction, that is substantially straight; with, their side walls 12, 12a and 13, 13a aligned approximately parallel with the tool body axis or fluted slightly obliquely, that is, forming a small axial angle with the tool body axis 16, so that the side walls also will form a small angle with the longitudinal axis 16 of the tool body 1. The side walls 12, 13 that include the seats 10, 11 for the bits are embodied as flat and are located approximately in diameter planes of the tool body 1. The pocketlike indentations that receive the seats 10, 11 for the bits are chosen such that the rotatable cutting bits 7, 8 are flush at the top with these side walls 12, 13 or protrude only slightly past them. The other two side walls 12a, 13a may also be flat surfaces, as is true in the present case for the side wall 13a next to the radially inner rotatable cutting bit 8. However, they may also have a concave curvature, as shown in the exemplary embodiment for the side wall 12a of the chip removal space.

In segment II, which is axially immediately adjacent to the first segment I, the two chip removal spaces 14, 15 are embodied as partly twisted. As can be seen from the developed view in FIG. 4 of the chip removal space 14 associated with the radially outer rotatable cutting bit 7, the angle of inclination 20, measured toward a diameter plane 19 that includes the tool body axis 16, of the coiling in the exemplary embodiment chosen is approximately 15° (for a drill body diameter of 24 mm), which over the axial length of the partly twisted segment (II) is equivalent to a clockwise twist of the chip removal spaces 14, 15 by approximately 30° in terms of FIG. 1. The angle of inclination 20 for typical bore body diameters is as a rule in the range from approximately 5° to 30°, while the twist of the chip removal spaces 14, 16 over the axial length of the segment II is normally approximately 10° to 60°. This twist of the chip removal spaces over the length of the partly twisted segment II is in any case less than 90° along the circumference of the tool body 1, however. This can be seen from a comparison of the plan view of the end of the drill body 1 of FIG. 5 and the cross-sectional view of FIG. 7 at the end of segment II, and this twist is marked 21.

The precise dimension of the twist 21, which is to be made over the axial length of the partly twisted segment II, depends on the form of the chip removal spaces 14, 15 and of the drill body 1. It is chosen such that the main axis, marked 0-0 in FIG. 7, of the areal moment of inertia for bending of the drill body 1, at the end of the partly twisted segment II, is rotated about the drill body axis 16 to an angular position that at least approximately corresponds to the angular position of the resultant radial force F of FIG. 5 that occurs in machining. Since the drill body 1, in segment III that adjoins the partly twisted segment II, has the maximum stiffness to counter bending in the direction of the main axis 0-0 of the forces of inertia, or in other words the axis of its maximum areal moment of inertia, with this alignment of the main axis of inertial forces of the areal moment of inertia with the direction of the resultant radial force F, the radial migration occurring in machining of the radially outer cutting edge corner 7b of the radially outer rotatable cutting bit is minimal, and in any case is so slight that it does not impair the attainable accuracy of the drilling process.

The accurate angular position of the main axis 0-0 of inertia relative to the chip removal spaces 14, 15 at the end of the partly twisted segment II can be either calculated or ascertained by experimentation. The same is also true for the orientation of the resultant radial force F that occurs as a function of the cutting edge geometry used and the installed position of the rotatable cutting bits 7, 8.

In the partly twisted segment II, the two chip removal spaces 14, 15, adjacent to the flat side wall segments 12, 13 of the straight-fluted segment I, each have a helically coiled striplike region 12', 13', beginning at the circumference of the drill body 1; this striplike region is flat, cross-wise to the length. Radially adjacent on the inside to this striplike region 12' and 13', the two chip removal spaces 14, 15 in segment II are curved essentially elliptically in cross section, as can be seen from FIG. 6, for instance, where 23, in dot-dashed lines, completes the (theoretical) outline of the ellipse.

In the segment III (FIGS. 2, 4) axially adjacent to the partly twisted segment II, the two chip removal spaces 14 are straight-fluted, or in other words are aligned parallel with the drill body axis 16. The striplike, flat side wall regions 12' and 13' that are helically coiled in the partly twisted segment II and that begin at the circumference of the drill body 1 continue, extending rectilinearly, in the form of segments 12" and 13" in segment III. Otherwise, in segment III, the chip removal spaces 14, 15 again have an essentially elliptical cross-sectional shape, as can be seen from FIG. 7.

Since the chip removal spaces 14, 15 in segment III are straight-fluted, and the tool body 1 has a constant diameter, the areal moment of inertia of the tool body 1 remains unchanged over the axial length of segment III. Depending on the particular drill length desired, the length of the straight-fluted segment III of the tool body 1 can thus be dimensioned to suit the intended use, without any change to the end region of the drilling tool in segment I or to the twist in the adjacent partly twisted segment II. Regardless of the drilling depth to be attained, constant conditions are always obtained in terms of the bending and torsional stiffness of the drill body; the tool body 1 is merely lengthened in the straight-fluted segment III.

In drilling, or in other words material removing machining of the workpiece, the chips produced at the operative main cutting edges 7a, 8a of the rotatable cutting bits 7, 8 are received, in the adjacent, partly twisted segment II, by the chip removal space side wall 12'a and 13'a opposite the respective rotatable cutting bit 7 and 8, so that they cannot be pressed radially outward toward the bore wall. Instead, they are conducted correspondingly through the partial twist into the straight-fluted chip removal space portions of the straight-fluted segment III, through which they are then conducted radially outward via a curved discharge depression 24 formed in the annular flange 3. In the partly twisted segment II, the chips formed in the straight-fluted segment I undergo a certain reinforcement of their motion because of the helical form of the chip removal spaces 14, 15, since the coiling or twisting, in plan view on the end face of the drill body toward the cutting edge, is formed counter to the direction of rotation of the drilling tool in operation. This effect can be still further reinforced if the chip removal spaces 14, 15 in segments II and III are positioned at a certain positive radial angle, which may be on the order of magnitude of approximately 4° to approximately 20°. This positive radial angle that the flat side wall regions 12', 12" and 13', 13" form with the respective radius, are shown at 25, 26 in FIGS. 6, 7. In the present case, they are different for the two chip removal spaces 14, 15; the radial angle for the chip removal space 15 associated with the radially inner rotatable cutting bit 8 is smaller than for the chip removal space 14. The radial angles may also be equal or may be unequal in opposite directions, as described above.

The described embodiment of the tool body 1 with the chip removal spaces 14, 15 that are partly twisted only in segment II makes it simple to form coolant ducts for the rotatable cutting bits 7, 8. As seen particularly from FIGS. 6, 7, the essentially I-shaped or dumbbell-shaped cross section of the drill body 1 over its entire length makes it possible specifically to accommodate two axially parallel coolant ducts 27, which are radially spaced apart from the drill body axis 16 and open at the end face 17. The coolant ducts need not be coiled or otherwise shaped in a complicated way. Flutelike connecting ducts 28 (FIG. 1) are formed in the end face 17; they lead into the chip removal spaces 14, 15 in the vicinity of the rotatable cutting bits 7, 8 and communicate with the coolant ducts 27. On their other end, the coolant ducts 27 lead away, in the manner shown in FIG. 2, from a radial distributor duct 29 into the annular flange 3, which is formed as a blind bore, which is closed on one end by a threaded stopper 30, and into which a feed duct 31 coaxial with the drill body axis 16 leads through the fastening shank 2. An associated internal thread 32, provided in the fastening shank 2, serves to connect a coolant line, not otherwise shown.

Particularly in drilling tools whose tool body 1 is of relatively large diameter, the coolant supply to the rotatable cutting bits 7, 8 can alternatively be made in the manner shown in FIG. 3. In this embodiment, the coolant supply duct 31, which is coaxial with the tool body axis 16, is lengthened as far as a branching point 33 in the region of segment II. At the branching point 33, to ducts 34 formed as straight bores and forming an acute angle with one another lead away to the face end 17 of the tool body 1, where they discharge into the connecting ducts 28. A prerequisite of this embodiment is that the remaining core of the tool body 1 between the two chip removal spaces 14, 15 is large enough to accommodate the central supply duct 31 without excessively weakening the tool body 1.

In the exemplary embodiment of the novel drilling tool described, the chip removal spaces 14, 15 each have one striplike region 12, 12', 12" and 13, 13', 13", respectively, which begins at the circumference of the tool body 1 and is flat, being additionally helically coiled only in the partly twisted region II. Alternatively, that region could also be formed as concave or convex.

It Should also be noted that drilling tools also exist that have more than two chip removal spaces, each of which is assigned corresponding cutting element seats. The invention is equally applicable to these tools. The same is also true for drilling tools that have only one chip removal space.

Various changes and modifications may be made, and features described in connection with any one of the embodiments may be used with any of the others, within the scope of the inventive concept.

We claim:

1. A boring or drilling tool, in particular for metallic materials, having an essentially cylindrical tool body (1) defining a longitudinal axis (16), which tool body (1), on a fastening end, has a coaxial fastening shank (2) and an opposite end, said opposite end defining a cutting-edge end;

at least one cutting element seat (10, 11) for receiving said at least one cutting element (7, 8) located at said cutting-edge end (4);

at least one flute-like chip removal space or recess (14, 15) formed on an outer circumference of the tool body (1), said chip removal space or recess being open on said cutting edge end (4) of the tool body (1) in an end face

(17) thereof, and extending over the length of the tool body into the region of its fastening end, and said at least one seat (10, 11) for receiving said at least one cutting element (7, 8) being formed in the region of the chip removal space or recess (14, 15) on the cutting edge end (4) of the tool body;

wherein said at least one cutting element (7, 8) is secured to the at least one seat (10, 11) and has at least one cutting edge operative on said end face (17) of the tool body (1);

wherein said at least one cutting element (7, 8) protrudes radially with an outer cutting edge corner (7b) adjoining said at least one cutting edge (7a, 7b), beyond the circumference of the tool body (1), said outer cutting corner (7b) defining, in operation of the tool, a flight circle, whereby in material removing machining, cutting forces act on said at least one cutting edge (7a) at said end face of the tool body (1) and to generate a resultant radial force (F) which is radially oriented with respect to said longitudinal axis (16) and located at an angular position relative to said at least one cutting element;

said tool further comprising means for improving the rigidity of the tool body (1) and for counteracting elastic bending under the influence of said resultant radial force (F), said means including the shape of the at least one chip removal space or recess (14, 15) in the tool body, wherein each chip removal space or recess (14, 15) is divided into three axially adjacent segments (I, II, III);

a first segment (1) adjoining said end face (17) of the drill body and including the at least one cutting element seat (10, 11), and extending in axial direction at least slightly beyond the axial length of the at least one cutting element from the cutting end (4);

a second segment (II) axially adjoining said first segment and being formed, helically, with a twist (21) of less than 90° relative to said longitudinal axis (16) of the tool body, said third segment (III) axially adjoining said second segment and being formed essentially straight-fluted and oriented at least substantially parallel to said longitudinal axis; and wherein the axial length and twist in said second segment (II) is dimensioned such that the primary axis of inertia (0-0) of the geometrical moment of inertia in a cross-section where the second segment (II) adjoins the third segment (III), at least approximately corresponds to the angular position of the resultant radial force (F).

2. The tool of claim 1, wherein the angle of inclination (20) in the second helical segment (II) is between approximately 5° and approximately 30°.

3. The tool of claim 1, wherein said twist (21) over the axial length in the second helical segment (II) is between approximately 10° and approximately 60°.

4. The tool of claim 1, wherein in the first segment (I), at least the side wall (12; 13) containing a cutting element seat (10; 11) in each chip removal space (14, 15) is essentially flat.

5. The tool of claim 4, wherein in the first segment, at least one chip removal space (15) is defined by two essentially flat side walls (13, 13a).

6. The tool of claim 4, wherein at least in the second partly helical segment (II), the side wall (12), defining the chip removal space (14) on the side associated with a radially outer cutting element (7), has a striplike region (12') that is coiled helically, beginning at the circumference of the drill body (1).

7. The tool of claim 1, wherein each chip removal space (14, 15), at least on its side toward the drill body axis, is curved essentially circularly or elliptically in cross section.

8. The tool of claim 1, wherein in the second segment (II), the side walls that define the respective chip removal space (14, 15) have a radial angle (25, 26) other than zero.

9. The tool of claim 8, wherein the radial angle is positive.

10. The tool of claim 9, wherein the radial angle is between approximately 4° and approximately 20°.

11. The tool of claim 1, wherein in the third segment (III) the side walls defining the respective chip removal space (14, 15) have a radial angle other than 0 on at least one side.

12. The tool of claim 11, wherein the radial angle is positive.

13. The tool of claim 11 wherein radial angle is between approximately 4° and approximately 20°.

14. The tool of claim 1, wherein a pocketlike recess is formed in a side wall (12, 13) of each cutting element seat (10, 11) in the first segment (I) of the respective chip removal space, and the respective side wall (12; 13) of the chip removal space is substantially located in the same plane as, or is slightly set back from, the top of the associated cutting element (7, 8).

15. The tool of claim 1, wherein essentially straight coolant ducts (27, 31) are formed in the drill body (1), leading to at least one cutting element (7, 8) and extending over at least part of the length of the chip removal spaces (14, 15).

16. The tool of claim 15, wherein the respective coolant duct (27; 34) opens at the end face (17) toward the cutting edge of the drill body 1.

17. The tool of claim 16, wherein in the first segment (I), at least one connecting duct (28) is formed, leading from the coolant duct (27) into a chip removal space (14, 15).

18. The tool of claim 17, wherein the connecting duct (28) is formed as a flute in the end face (17) of the drill body (1).

19. The tool of claim 9, wherein the radial angle is between approximately 6° and 8°.

20. The tool of claim 1, wherein, in said first segment (I), said at least one chip removal space (14, 15) extends essentially axially, and is formed with side walls oriented substantially parallel to said longitudinal axis (16) of the drill body.

21. The tool of claim 1, wherein, in said first segment (I), said at least one chip removal space (14, 15) extends slightly obliquely fluted, and has side walls oriented at a slight angle with respect to said longitudinal axis of the tool body (1).

22. The tool of claim 1, wherein said at least one seat (10, 11) comprises two seats;

said at least one cutting element comprises two cutting elements (7, 8), each secured on a respective seat; and wherein said at least one chip removal space or recess (14, 15) comprises two chip removal spaces or recesses (14, 15).

23. The tool of claim 1, wherein the angle of inclination (20) in the second part helical segment (II) is approximately 15°.

24. The tool of claim 1, wherein said twist (21) over the axial length of the second helical segment (II) is approximately 30°.

25. The tool of claim 11, wherein the radial angle is between approximately 6° and 8°.

* * * * *